March 19, 1957 G. I. HOLMES ET AL 2,785,873
ELECTROMAGNETIC CONTROL DEVICE
Filed Aug. 19, 1950 2 Sheets-Sheet 1
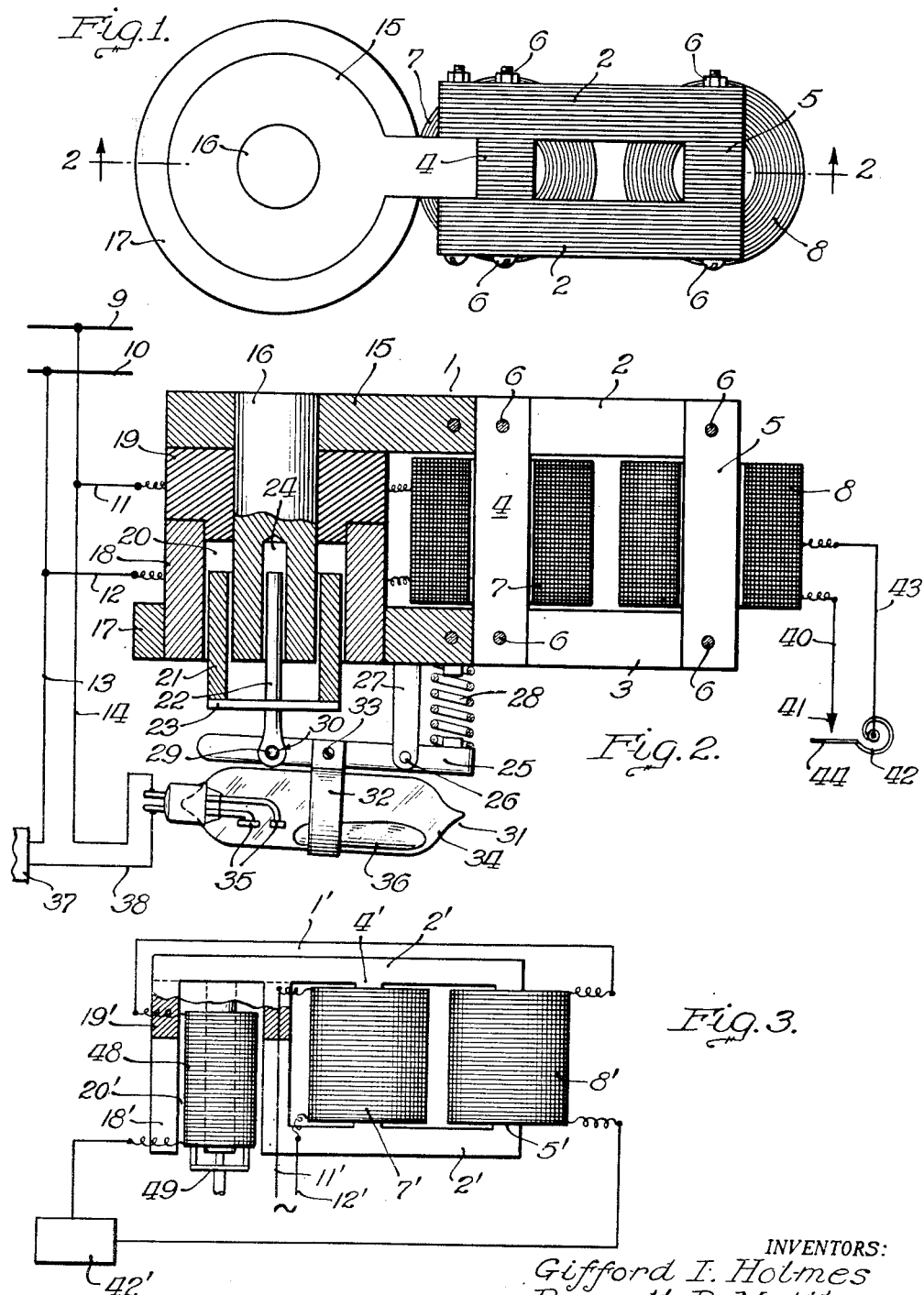
INVENTORS:
Gifford I. Holmes
Russell B. Matthews

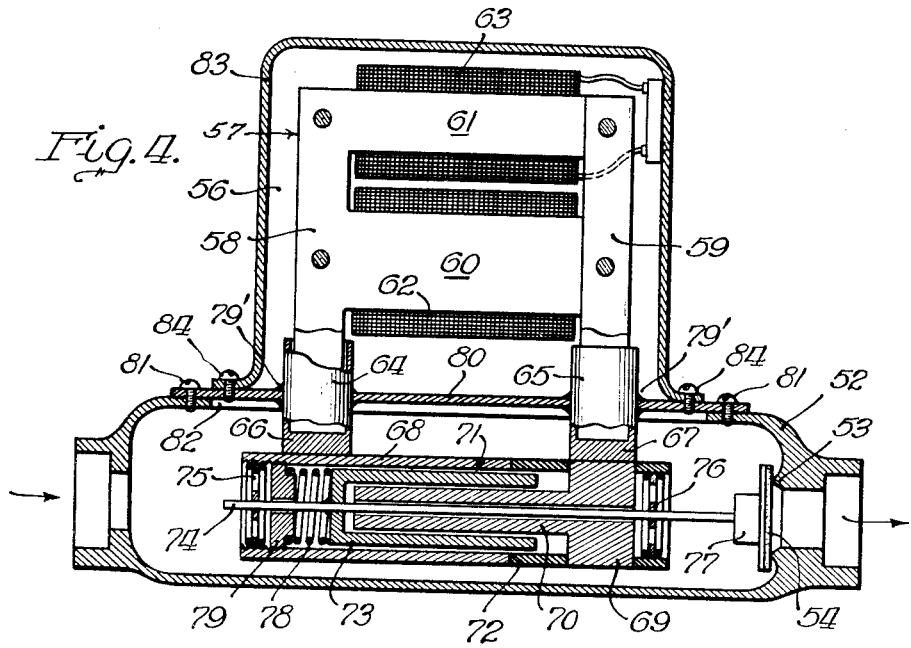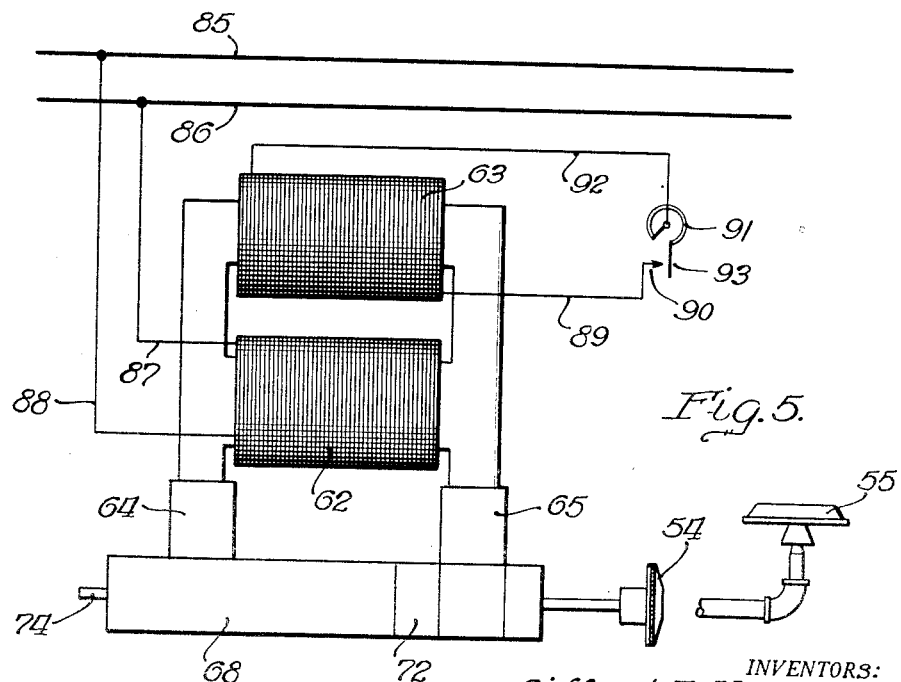

United States Patent Office 2,785,873
Patented Mar. 19, 1957

2,785,873

ELECTROMAGNETIC CONTROL DEVICE

Gifford I. Holmes, Waukesha, and Russell B. Matthews, Wauwatosa, Wis., assignors to Milwaukee Gas Specialty Company, Milwaukee, Wis., a corporation of Wisconsin Application August 19, 1950, Serial No. 180,482

7 Claims. (Cl. 251—137)

This invention relates in general, to control devices, and has particular relation to an improved electromagnetic control device.

While the particular devices which we shall describe hereinafter in connection with the drawings, are adapted for use for controlling an electric switch or a valve or the like, for in turn controlling a heater or a cooling device or the like, it is to be understood that the invention may be employed for controlling other devices, systems, or apparatus as suitable or desired.

Electromagnetic control devices utilizing the force of electromagnetic repulsion as distinguished from the force of attraction are known in the art. In such repulsion devices the initial operating force is a maximum, whereas in attraction type devices, the force exerted is usually a minimum in the initial position.

Many devices, such as valves, switches and the like, require a large initial or starting force. A power force must be used which is large enough to overcome the inertia and friction of the moving parts, and where the operated device is a valve, the pressure, for example, of the gas for a gas heater, or other controlled fluid, usually tends to hold the valve closed. The power force which is used must therefore also overcome this fluid pressure in the initial operation of the control device.

One of the main objects of the present invention is to provide a new and improved electromagnetically responsive control device utilizing the force of electromagnetic repulsion whereby to provide a relatively large initial or starting force to provide an action which is prompt and positive.

Another object of the invention is to provide an electromagnetically responsive control device in which the desired action is obtained by electric induction whereby the effects of residual magnetism are eliminated and the chances of sticking of the device in an unsafe or undesired position are reduced.

Another object of the invention is to provide a device of simple, compact and relatively inexpensive construction, which will lend itself for controlling a switch, valve or other controlling device, for example, by a thermostat or other condition responsive device.

Another object of the invention is to provide a repulsion type electromagnetically responsive control device comprising a winding provided with a core having a first core portion through which flux established by energization of the winding is adapted to pass, the core having a second core portion provided with an air gap, and there being flux diverting means operable to divert flux from the first core portion to the second core portion and the air gap, and a non-magnetic and conducting member positioned to travel freely in the air gap and in which the electric current is induced with accompanying repulsion of said member by the flux diverted to the second core portion and through the air gap by the flux diverting means.

Another object of the invention is to provide a device in which the core, and the windings for establishing and diverting the magnetic flux through the core constitute a current limiting step-down transformer wherein the electric energy produced in a secondary winding may be relatively low and substantially constant so that the secondary circuit and a thermostat or other control device therefor will not be deleteriously affected by the energizing current supplied to the primary winding, and so that the type of insulating conduits required for line voltage conductors are unnecessary.

Another object of the invention is to provide a device which is immune to short circuits on the secondary side of the transformer from the standpoint of damage due to overheating.

Another advantage of the device of the present invention over previous devices, is that the stand-by power loss is low; that is, there is lower power consumption when the secondary circuit is not energized. This stand-by loss compares favorably with a conventional current limiting transformer.

Further objects and advantages of the invention will appear from the following detailed description taken in connection with the accompanying drawings.

In the drawings:

Figure 1 is a top plan view of one form of electromagnetic control device embodying the present invention;

Figure 2 is a longitudinal section of the magnetic core and windings with the associated parts partially in section and partially in elevation, and showing more or less diagrammatically, portions of the electric circuit for the device;

Figure 3 is a diagrammatic view, showing more or less schematically, a modified form of the invention having a wound coil for the actuator;

Figure 4 is a longitudinal section similar to Figure 2, of another embodiment of the invention; and Figure 5 is a circuit diagram of the device shown in Figure 4.

Referring first to Figures 1 and 2 of the drawings, the embodiment of the invention therein illustrated comprises a magnetic core of laminated form as shown, or of other suitable form. The particular core 1 selected for illustration is made up of a pair of parallel legs 2 and 3 magnetically connected at spaced positions by parallel legs 4 and 5 disposed at right angles to the legs 2 and 3. Legs 2 and 3, are, for example, bolted to the legs 4 and 5 at 6. An alternating current primary winding 7 is wound around the leg 4 and a secondary winding 8 is wound around the leg 5. It is to be understood however, that either winding 7 or winding 8 may be the primary winding, and either may be the secondary winding without affecting operation of the device. Electric power for energizing the winding 7 is supplied from a suitable source, for example, from line wires 9 and 10 of a suitable source of alternating current such as a household current supply line of the type which averages about 115 volts. The ends of the winding 7 are connected to the line wires 9 and 10 by connectors 11 and 12, and conductors 13 and 14.

An iron or magnetic flux path is completed by a magnetic plate 15 and through a magnetic pin or post 16 in the plate 15 and a second magnetic plate 17 having an annular magnetic sleeve 18 therein. The post 16 extends into the sleeve 18 with an annular space or air gap therebetween. The sleeve 18 and plate 15 are separated by a non-magnetic spacer 19 which may be formed of non-magnetic high specific resistance material, such as stainless steel, or any suitable plastic, or other non-magnetic material. Such a structure results in an annular space 20 between the post 16 and the sleeve 18 in which a non-magnetic and electric conducting sleeve 21 is free to travel.

A guide pin 22 on the outer end wall 23 of sleeve 21 may be provided for cooperation with a hole 24 axially disposed within post 16 to maintain axial alignment of these parts. If desired the pin 22 and hole 24 may be coated or impregnated with a suitable lubricant, for example, a dry lubricant such as graphite or molybdenum sulphite or the like, to provide for ready movement of the pin 22 and sleeve 21 as will presently appear.

A rocker arm 25 is pivoted at 26, for example, on a post 27 carried by and projecting from the second plate 17. The rocker arm 25 is biased for clockwise movement about pivot 26 by a spring 28 interposed, for example, between the plate 17 and one end of the arm 25. A pin 29 carried by the rocker arm 25 on the other side of pivot 26 engages loosely in an eye or opening 30 in the adjacent end of pin 22, so that movement of sleeve 21 will tilt or rock arm 25 about its pivot 26.

Although not limited thereto, the illustrated use of this embodiment of the invention is in connection with an electric switch which is moved to make or break an electric circuit by movement of the sleeve 21 which is non-magnetic and preferably of good conducting material, such as copper, aluminium, or other suitable conducting material. Accordingly, there is shown a mercury switch 31 mounted on an adjustable clip 32 attached at 33 to rocker arm 25 so that the mercury switch will tilt or rock with the arm 25. The switch 31 may comprise the usual container or bulb 34 in which is housed a plurality (two in the illustrated embodiment of the invention), of electrodes or contacts 35, and a mercury globule 36. When the switch is tilted in one direction, the mercury is caused to shift its position so as to bridge the terminal contacts 35, and when the switch is tilted in the opposite direction the mercury separates from the terminal contacts 35 so as to open the electric circuit. Where the actuated device is a switch, other forms of switches are contemplated within the scope of the present invention.

Where the control device of this invention is used, for example, for controlling a heating or cooling device as shown diagrammatically at 37 in Figure 2, one side of this device may be connected by a conductor 13 to one of the line conductors 10. The other side of the device 37 is connected by a conductor 38 to one of the terminal contacts 35. The other terminal contact 35 is connected by conductor 14 to the other line conductor 9.

One end of the secondary winding 8 is connected by a conductor 40 with a fixed contact 41 of a thermostat 42. A conductor 43 connects the other terminal 44 of the thermostat 42 to the other end of the secondary winding 8. The thermostat may be positioned in a room or other space, or it may be placed where it will be subject to the temperature of a heater, or otherwise disposed as desired. It is also contemplated that the device 42 instead of being a temperature responsive thermostat, may be any other condition responsive means or other device for opening and closing the circuit of the secondary coil 8 as suitable or desired.

In the operation of the device, the primary winding 7 is always energized from the line wires 9 and 10 or other suitable source of power. With the thermostat 42 in position separating its contact 44 from contact 41, the circuit for winding 8 is open and this winding is not energized. At this time the magnetic flux established by energization of primary coil 7 passes through the legs 2, 3, 4 and 5 of the core 1 and very little flux passes, for example, from plate 15 through post 16 to sleeve 18 and plate 17.

When, however, for example, the temperature to which thermostat 42 is responsive falls, the thermostat 42 closes the contact 44 into engagement with contact 41. This closes the circuit of the secondary winding 8 and current is induced in this winding by the energization of the primary winding 7. This current induces magnetic flux which opposes the magnetic flux established in leg 5 by the primary winding 7. As a result, the flux established by the winding 7 is diverted, for example, through the plate 15, post 16, through air gap 20 to plate 17 and through this plate back through the leg 4 of core 1.

Since the sleeve 21 is in effect a closed loop of good conductivity, there is induced in sleeve 21 an alternating current of opposite polarity to that impressed upon the winding 7. This alternating current so induced in turn induces an alternating flux field about the sleeve 21. The polarity of at least a portion of the field thus induced opposes the magnetic flux established by the energization of the winding 7. As a result, sleeve 21 is repulsed or repelled outwardly or downwardly out of the air gap 20. This causes rocking or tilting of rocker arm 25 and consequent rocking or tilting of mercury switch 31, for example, in a direction to close the circuit for the heater 37 to effect heating operation thereof. The rocking of switch 31 by repulsion of sleeve 21 may, within the scope of the present invention, either make or break the circuit between contact terminals 35.

When thermostat 42 disengages contact 44 from contact 41 the magnetic flux established by energization of winding 7 is again short circuited through core legs 2, 3, 4 and 5 and very little flux will exist in the air gap 20. Hence the spring 28 will cause the rocker arm 25 to rotate in a clockwise direction about its pivot 26 with an attendant opposite movement of the mercury 36 within the tube 34 and, for example, consequent breaking of the contact between contact terminals 35.

Figure 3 shows a generally similar arrangement to that shown in Figures 1 and 2, but in this case the secondary winding 8' has in series therewith a wound actuating coil 48. The coil 48 operates in the air gap 20' similar to the operation of the sleeve 21 of the previous embodiment of the invention—in one way by repulsion. The coil 48 sets up an opposing electromotive force with respect to the primary winding 7' when, for example, thermostat 42' is in its contact closed position. The primary winding 7' is energized from a source of alternating current, for example, through conductors 11' and 12' leading to line conductors (not shown) as in the preceding embodiment of the invention.

The structure shown in Figure 3, will in every way, provide a similar function to that described in connection with Figures 1 and 2, but the total energy can be more properly controlled by controlling the coils in the secondary circuit which includes the movable coil 48. The form for the coil 48 is connected to an actuator 49 which may operate a switch in the manner, for example, more fully shown in Figure 2, or a valve or other device.

Figure 4 shows a valve body 52 having a valve seat 53 and a valve 54 cooperable with the seat 53 for controlling the flow of fluid through the valve, for example, the flow of gas to a burner 55 as shown schematically in Figure 5. A transformer operator 56 comprises a magnetic core 57 having legs 58, 59, 60 and 61. A primary winding 62 is wound around the leg 60 and a secondary winding 63 is wound around the leg 61.

The legs 58 and 59 have projecting ends which extend into magnetic cups 64 and 65, the closed ends 66 and 67 of which abut at spaced positions against the magnetic sleeve 68 and against a magnetic member 69 having a magnetic post 70 extending axially within the sleeve 68 with an annular air gap 71 therebetween. The sleeve 68 and member 69 are separated by a non-magnetic spacer sleeve 72 which may be formed, for example, of high specific resistance and non-magnetic stainless steel, particularly where the device is to be used in a gas stream. A tubular plunger 73 which is formed of non-magnetic and electric conducting material such as copper or aluminum has movement in the air gap 71 and is attached to a rod or valve stem 74 which moves axially with the movement of the plunger 73.

The rod 74 is guided in bearings 75 and 76 and is fastened as at 77 to the valve 54. A spring 78 which may be adjusted by a screw 79 urges the valve stem 74 to the right to close the valve 54. The cups 64 and 65 are, for example, welded, brazed or otherwise suitably secured at 79' in openings in a plate 80 formed, for example, of high specific resistance and non-magnetic stainless steel. The plate 80 is removably fastened for example, by screws 81 over an opening 82 in the valve body 52. A housing 83 encloses the operator and is attached, for example, by screws 84 to the plate 80.

The primary winding 62 is connected to the line conductors 85 and 86, for example, by conductors 87 and 88 as shown in Figure 5. The secondary winding 63 has one of its conducting leads 89 connected to the fixed contact 90 of a thermostat 91 and its other lead conductor 92 is connected to the other terminal 93 of the thermostat.

The primary winding 62 and secondary winding 63 are magnetically short circuited when the secondary circuit is open. With the secondary circuit closed, for example, by the thermostat 91 the magnetic flux is constrained to pass through the magnetic sleeve 68, post 70 and through the air gap 71.

The device of Figure 4 operates identically to the device shown in Figure 2 inasmuch as when the magnetic flux is constrained to pass through the air gap 71 the sleeve 73 is caused to tend to move out of the air gap by repulsion. This causes a left hand motion of rod 74 and hence movement of the valve 54, for example, to open position. When the secondary circuit is open the magnetic flux is shorted through the legs 58, 59, 60 and 61, and the spring 78 moves the valve 54 in the opposite direction for example, to closed position.

While we have shown and described a flux diverting secondary winding and associated core legs in each embodiment of the invention, it is to be understood that this winding and core portion may be omitted within the scope of the present invention. In such case, the thermostat or other means may be placed directly in the circuit between the primary winding and the line conductors. This will provide a line voltage device which is rendered operable by energization of the primary winding and rendered inoperable by opening the circuit for the primary winding.

The embodiments of the invention shown in the drawings are for illustrative purposes only, and it is to be expressly understood that said drawings and the accompanying specification are not to be construed as a definition of the limits or scope of the invention, reference being had to the appended claims for that purpose.

We claim:

1. A device of the class described comprising, in combination, a first winding provided with a core having a first core portion through which flux established by energization of the winding is adapted to pass, said core having a second core portion provided with an air gap, flux diverting means operable to divert flux from said first core portion to said second core portion and said air gap, a non-magnetic and conducting member positioned to travel freely in said air gap and to be repulsed by the passage of flux diverted to said second core portion and to the air gap therein by said flux diverting means, the second core portion comprising a first magnetic member, a magnetic sleeve on said first magnetic member, a second magnetic member, a magnetic post on said second magnetic member and extending into said sleeve with an air gap therebetween, a non-magnetic spacer separating said magnetic sleeve from said second magnetic member, actuator means comprising a non-magnetic and conducting member positioned for movement in said air gap and in which electric current is induced with accompanying repulsion of said non-magnetic and conducting member by the flux diverted through the second core portion and to the air gap by the flux diverting means, and guide means comprising a stem engaged for movement with said non-magnetic and conducting member and disposed within an opening in the magnetic post for guiding said non-magnetic and conducting member.

2. A device of the class described comprising, in combination, a first winding provided with a core having a first core portion through which flux established by energization of the winding is adapted to pass, said core having a second core portion provided with an air gap, flux diverting means operable to divert flux from said first core portion to said second core portion and said air gap, a non-magnetic and conducting member positioned to travel freely in said air gap and to be repulsed by the passage of flux diverted to said second core portion and to the air gap therein by said flux diverting means, and guide means comprising a stem engaged for movement with said non-magnetic and conducting member and disposed within an opening in the magnetic post for guiding the non-magnetic and conducting member.

3. A device of the class described comprising, in combination, a valve body having a valve seat therein and an opening, a plate attached to the valve body over said opening, a magnetic sleeve within said valve body, a magnetic post extending axially within said sleeve with an annular air gap therebetween, said post having a head at one end separated from the adjacent end of said sleeve by a non-magnetic spacer, magnetic cups extending through and secured in openings in said plate and having closed inner ends one abutting said sleeve and the other abutting said post, a magnetic core having legs extending into said cups and a connecting leg, an exciting winding on said connecting leg, a non-magnetic and conducting member positioned to travel in the air gap and to be repulsed by the passage of magnetic flux across said air gap, and a valve stem extending through an opening in said post and connected to the non-magnetic and conducting member.

4. An electromagnetic operator comprising a magnetically permeable frame having a first closed magnetic flux path and a second flux path including spaced pole piece portions formed with spaced arcuate concentric pole faces defining an air gap, an energizing winding affording when energized magnetic flux in said first flux path, means for shunting said magnetic flux from said first path to said second path and across said air gap, means controlling said flux shunting means and thereby the shunting of flux across said air gap, and an actuating member composed substantially entirely of one substantiallly homogeneous metal only interposed between said arcuate pole faces and having concentric arcuate peripheral surface portions substantially coaxial with said pole faces, deformable biasing means biasing said actuating member toward a first position, said shunted flux flowing from one pole face through said air gap and through said actuating member from one of said peripheral surface portions to the other and thence to the other pole face to actuate said actuating member away from said first position with maximum force at the beginning of its movement against the bias of said biasing means deforming said means to cause the latter to exert increasing biasing force with increasing deformation, said actuating member quietly coming to rest at a second position defined substantially solely by equalization of the actuating force of said member and the increasing biasing force of said biasing means, said peripheral surface portions of said actuating member remaining at all times substantially coaxial with said arcuate pole face surface portions, said actuating member being adapted for connection to a member to be controlled.

5. An electromagnetic operator comprising a magnetically permeable frame having a first closed magnetic path and a second magnetic flux path having pole pieces formed with spaced arcuate concentric surface portions defining an air gap, a primary winding affording when energized magnetic flux in said first flux path, a secondary winding having a low voltage circuit supplied therefrom, said magnetic flux afforded in said first flux path by said primary winding inducing a current in said secondary winding when said circuit is closed to block flow of magnetic flux through said first path and to divert said magnetic flux through said second path and across said air gap, an actuating member composed substantially entirely of one substantially homogeneous metal only adapted for connection to a member to be controlled and interposed between said arcuate pole faces and having concentric arcuate peripheral surface portions substantially coaxial with said pole faces, deformable biasing means biasing said actuating member toward a first position, said diverted flux flowing from one pole face through said air gap and through said actuating member from one of said peripheral surface portions to the other and thence to the other pole face to actuate said actuating member away from said first position with maximum force at the beginning of its movement against the bias of said biasing means deforming said means to cause the latter to exert increasing biasing force with increasing deformation, said actuating member quietly coming to rest at a second position defined substantially solely by equalization of the actuating force of said member and the increasing biasing force of said biasing means, said peripheral surface portions of said actuating member remaining at all times substantially coaxial with said arcuate pole face surface portions, and circuit controlling means in said low voltage circuit supplied from said secondary winding controlling induction of current in said secondary winding, and thereby the diversion of magnetic flux through said second path and movement of said actuating member.

6. A device of the class described, comprising a magnetically permeable frame having a first closed magnetic flux path and a second magnetic flux path including spaced pole pieces formed with spaced arcuate concentric faces defining an air gap therebetween, a primary winding affording when energized magnetic flux in said first flux path, a secondary winding having a low voltage circuit supplied therefrom, said magnetic flux afforded in said first flux path by said primary winding inducing a current in said secondary winding when said circuit is closed to block the flow of flux through said first path and divert said magnetic flux through said second path and across said air gap, a non-magnetic and conductive actuating member composed substantially entirely of one substantially homogeneous metal only interposed between said arcuate pole faces and having concentric arcuate peripheral surface portions substantially coaxial with said pole faces, deformable biasing means biasing said actuating member toward a first position, said diverted flux flowing from one pole face through said air gap and through said actuating member to the other pole face from one of said peripheral surface portions to the other to induce a current in said actuating member and thence cause actuation of said member away from said first position by repulsion with a maximum force at the beginning of its movement against the bias of said biasing means deforming said means to cause the latter to exert increasing biasing force with increasing deformation, said actuating member quietly coming to rest at a second position defined substantially solely by equalization of the actuating force of said member and the increasing biasing force of said biasing means, said peripheral surface portions of said actuating member remaining at all times substantially coaxial with said arcuate pole face surface portions, said actuating member being adapted for connection to a member to be controlled, and circuit controlling means in said low voltage circuit supplied from said secondary winding and controlling induction of current in said secondary winding, and thereby diversion of flux through said second path and movement of said actuating member.

7. A device of the class described, comprising a magnetically permeable frame having a first closed magnetic flux path and a second magnetic flux path including spaced pole pieces formed with spaced arcuate concentric faces defining an air gap therebetween, a primary winding affording when energized magnetic flux in said first flux path, a secondary winding having a low voltage circuit supplied therefrom, said magnetic flux affording in said first flux path by said primary winding inducing a current in said secondary winding when said circuit is closed to block the flow of flux through said first path and divert said magnetic flux through said second path and across said air gap, a non-magnetic and conductive actuating member comprising a coil connected in series with said secondary winding and its low voltage circuit interposed between said arcuate pole faces and having concentric arcuate peripheral surface portions substantially coaxial with said pole faces, deformable biasing means biasing said actuating member toward a first position, said diverted flux flowing from one pole face through said air gap and through said actuating member to the other pole face from one of said peripheral surface portions to the other to induce a current in said actuating member and thence cause actuation of said member away from said first position by repulsion with a maximum force at the beginning of its movement against the bias of said biasing means deforming said means to cause the latter to exert increasing biasing force with increasing deformation, said actuating member quietly coming to rest at a second position defined substantially solely by equalization of the actuating force on said member and the increasing biasing force of said biasing means, said peripheral surface portions of said actuating member remaining at all times substantially coaxial with said arcuate pole face surface portions, said actuating member being adapted for connection to a member to be controlled, and circuit controlling means in said low voltage circuit supplied from said secondary winding and controlling induction of current in said secondary winding, and thereby diversion of flux through said second path and movement of said actuating member.

References Cited in the file of this patent

UNITED STATES PATENTS

| | | |
|---|---|---|
| 363,186 | Thomson | May 17, 1887 |
| 370,573 | Thomson | Sept. 27, 1887 |
| 400,515 | Thomson | Apr. 2, 1889 |
| 778,569 | Dean | Dec. 27, 1904 |
| 1,116,283 | Howard | Nov. 3, 1914 |
| 1,672,193 | Bason | June 5, 1928 |
| 1,711,285 | Petersen | Apr. 30, 1929 |
| 1,973,925 | McCabe | Sept. 18, 1934 |
| 1,979,127 | Warrick | Oct. 30, 1934 |
| 1,982,335 | White | Nov. 27, 1934 |
| 2,509,835 | Moore | May 30, 1950 |
| 2,696,350 | Cretzler | Dec. 7, 1954 |

FOREIGN PATENTS

| | | |
|---|---|---|
| 576,778 | Germany | May 18, 1933 |
| 652,698 | France | Oct. 29, 1928 |